United States Patent [19]

Callahan et al.

[11] Patent Number: 5,102,552

[45] Date of Patent: Apr. 7, 1992

[54] MEMBRANES FROM UV-CURABLE RESINS

[75] Inventors: Robert W. Callahan, Charlotte; Richard D. Johnson, Monroe, both of N.C.

[73] Assignee: Hoechst Celanese Corporation, Charlotte, N.C.

[21] Appl. No.: 587,891

[22] Filed: Sep. 25, 1990

Related U.S. Application Data

[62] Division of Ser. No. 133,824, Dec. 16, 1987, Pat. No. 4,976,897.

[51] Int. Cl.⁵ .............................................. B01D 67/00
[52] U.S. Cl. ...................................... 210/654; 55/16; 210/490; 210/500.35
[58] Field of Search .................. 210/490, 500.35, 650, 210/651, 652, 654; 264/44, 22; 427/244, 245, 246; 55/16, 158

[56] References Cited

U.S. PATENT DOCUMENTS

| | | | |
|---|---|---|---|
| Re. 25,164 | 5/1962 | Cline | 117/62 |
| 2,999,056 | 9/1961 | Tanner | 204/154 |
| 3,281,263 | 10/1966 | Priesing et al. | 117/62 |
| 3,764,363 | 10/1973 | Civardi et al. | 117/10 |
| 3,853,601 | 12/1974 | Taskier | 117/98 |
| 4,055,696 | 10/1977 | Kamada et al. | 428/398 |
| 4,064,304 | 12/1977 | Fujita et al. | 428/207 |
| 4,137,084 | 1/1979 | Davis et al. | 427/44 X |
| 4,171,391 | 10/1979 | Parker | 427/246 |
| 4,214,020 | 7/1980 | Ward et al. | 427/296 |
| 4,234,623 | 11/1980 | Moshtev et al. | 427/58 X |
| 4,242,159 | 12/1980 | Klimmek et al. | 156/155 |
| 4,260,652 | 4/1981 | Taketani et al. | 427/245 |
| 4,269,869 | 5/1981 | Morohashi et al. | 427/54.1 |
| 4,278,728 | 7/1981 | Honda et al. | 428/313 |
| 4,321,286 | 3/1982 | Scott et al. | 427/152 |
| 4,333,998 | 6/1982 | Leszyk | 204/159.13 X |
| 4,346,142 | 8/1982 | Lazear | 428/315.7 |
| 4,388,189 | 6/1983 | Kawaguchi et al. | 210/490 |
| 4,389,454 | 6/1983 | Horacek et al. | 428/318.6 |
| 4,451,529 | 5/1984 | Kerr et al. | 427/44 X |
| 4,466,931 | 8/1984 | Tanny | 264/22 |
| 4,483,884 | 11/1984 | Troue | 427/379 X |
| 4,594,079 | 6/1986 | Yamamoto et al. | 55/158 |
| 4,613,533 | 9/1986 | Loomis et al. | 428/36 |
| 4,618,533 | 10/1986 | Steuck | 427/245 X |

FOREIGN PATENT DOCUMENTS

| | | |
|---|---|---|
| 0160473 | 11/1985 | European Pat. Off. . |
| 59-76504 | 5/1984 | Japan . |
| 2000788 | 1/1979 | United Kingdom . |
| 2058802 | 4/1981 | United Kingdom . |

OTHER PUBLICATIONS

"Measurement of Gas Permeability of Polymers. II. Apparatus for Determination of Permeabilities of Mixed Gases and Vapors"; D. G. Pye, H. H. Hoehn, M. Panar; *Journal of Applied Polymer Science*; vol. 20, 287–301 (1976).

*Primary Examiner*—Frank Spear
*Attorney, Agent, or Firm*—K. A. Genoni; J. M. Brown; B. H. Davidson

[57] ABSTRACT

A composite membrane is disclosed having a microporous support which is coated with a UV curable polymer composition having a sufficiently high viscosity to prevent pore filling upon coating and curing. A process for making and a process for using the membrane is also disclosed.

21 Claims, No Drawings

MEMBRANES FROM UV-CURABLE RESINS

This is a division of application Ser. No. 07/133,824 filed Dec. 16, 1987, now U.S. Pat. No. 4,976,897.

BACKGROUND OF THE INVENTION

1. Field of the Invention

The present invention relates to membrane separation processes and, more particularly, to composite-type membranes which may be used in such processes. The membranes include microporous supports which are coated with polymer compositions which have been cured with ultraviolet ("UV") light. The present invention also relates to a method for making such membranes.

2. Description of the Prior Art

Membrane separation processes are used widely in many fields of technology. These processes generally involve the permeation of gases or liquids through polymeric membranes where the driving force for their transport is either pressure or concentration. The membrane prevents hydrodynamic flow so that transport therethrough is by sorption or diffusion. Membranes are typically selective in what they transport and are considered semipermeable if, under identical conditions, they transport different molecular species at different rates. The rate of transport through membranes is a function of its permeability and is generally referred to as the flux.

Gas permeation processes generally involve the permeation of gases on the high-pressure side of the membrane to the low-pressure side. Liquid permeation, for example, involves the permeation of feed components from the liquid phase on one side of the membrane to the liquid or vapor phase on the other side.

As discussed above, the selectivity of separation membranes is an important factor in the satisfactory operation of membrane separation processes. In addition, membrane properties such as flux and resistance to chemical, biological and physical degradation also affect the efficiency of separation processes.

Of course, there have been many efforts to develop membranes which function efficiently in separation processes. Typical of such efforts include the development of composite-type membranes such as those disclosed in U.S. Pat. Nos. 4,242,159, 4,260,652, 4,277,344 and 4,388,189. These membranes include a microporous support having coated thereon a thin layer of polymeric material. However, previously known composite membranes have not been completely satisfactory since they can or may exhibit a variety of defects which affect physical, chemical and biological degradation resistance and flux, and thus the overall efficiency of the membrane processes for which they are used.

In an effort to overcome the above described deficiencies in composite-type membranes there have recently been attempts to produce composite-type membranes wherein the polymeric coating material is a UV curable material. The basic UV curable formulation generally includes a UV reactive unsaturated polymeric material, a photocatalyst and a reactive diluent.

For example, Japanese Kokai Patent No. Sho 59-76504 (1984) describes a reverse osmosis membrane which is manufactured by impregnating a porous support with a mixture of monofunctional monomer and bifunctional monomer and irradiating the mixture with light to polymerize the monomers. Furthermore, U.S. Pat. No. 4,613,533 also suggests that membranes coated with polymeric material may be cured using ultraviolet light.

As a general matter, however, there has been very little work done in examining the potential use of these type of membranes in separation processes which operate on a solution/diffusion mechanism such as gas separation, reverse osmosis, pervaporation and liquid/liquid separation. One possible explanation for the lack of development in this area is the failure of this type of membrane to exhibit a high flux value. That is, coating UV reactive mixtures onto porous supports followed by curing has been found to result in membranes having low flux. The conventional wisdom is that the UV reactive mixtures, after coating, tend to "wick up" and fill the pores of the microporous support thereby producing a membrane having an insufficient flux and unsuitable effective thickness which includes the porous support. This failure is unfortunate since UV curable systems have the potential to be tremendously advantageous in the area of membrane separation processes since a wide range of chemical and mechanical properties may be built into the polymeric systems thereby producing membranes having improved resistance to physical, chemical and biological degradation. Also, the simplicity of these systems compared to conventional systems is potentially appealing in that they involve solventless processes and curing by UV light. Curing by UV light is also advantageous since it is less expensive on a commercial scale than methods such as heat which have been used for curing conventional polymeric systems. The development of a useful UV curable resin coated composite membrane for application in membrane separation processes would therefore be an extremely important and desirable development.

SUMMARY AND OBJECTS OF THE INVENTION

In view of the foregoing limitations and shortcomings of prior art composite membranes and the need in the art for improved composite membranes which may be used in separation processes, it is therefore a primary objective of the present invention to fulfill that need by providing an improved UV curable resin coated composite membrane for use in membrane separation processes.

It is another object of the invention to provide for a UV curable resin coated composite membrane which exhibits suitable resistance to physical, chemical and biological degradation while exhibiting adequate flux.

It is yet another object of the present invention to provide a process for producing a UV curable resin coated composite membrane wherein wicking up of the pores of the microporous support is avoided.

In one aspect, the present invention provides a composite membrane including a microporous support and a UV curable resin coated thereon. It has been surprisingly found that by utilizing UV resin mixtures of sufficiently high viscosity, a composite membrane may be produced which has substantially reduced pore filling and which minimizes the problems associated with wicking up experienced by prior art composite membranes, including a membrane coated with a UV cured resin. This allows for the production of membranes having suitable flux and resistance to physical, chemical and biological degradation.

In another aspect, the present invention relates to a process of producing such a membrane. The process involves coating a microporous support with a UV curable resin of high viscosity and curing the resin while avoiding significant pore filling of the microporous support. In yet another aspect, the present invention relates to the use of the membranes in membrane separation processes such as gas separation, reverse osmosis, pervaporation and liquid/liquid separation.

With the foregoing and other objects, advantages, and features of the invention that will become hereinafter apparent, the nature of the invention may be more clearly understood by reference to the following detailed description of the invention and the appended claims.

DETAILED DESCRIPTION OF THE INVENTION

As mentioned hereinabove, the membrane of the present invention includes a microporous support which is coated with a UV curable resin. The membrane support may be any of those typically used in the art. For example, polyolefin supports such as those formed from polyethylene, polypropylene and polymethylpentene, polystyrene or substituted polystyrene supports, fluorinated polymer supports such as those formed from polytetrafluoroethylene, polysulfone supports, polyester supports such as those formed from polyethylene terephthalate and polybutylene terephthalate, polyacrylate and polycarbonate supports, and supports formed form vinyl polymers such as polyvinyl chloride and polyacrylonitriles may all be used in the present invention. The porous support should generally have an average pore size between about 0.005 and about 0.2 microns and preferably between about 0.02 and about 0.04 microns. Of course, the materials and porosity of a particular support may vary according to its ultimate end use in a particular separation process.

Suitable UV curable resin mixtures generally include a UV reactive unsaturated polymeric material, a photocatalyst and in some instances, a reactive diluent. Examples of UV reactive unsaturated polymeric materials which may be used in the present invention include acrylated epoxy resins, acrylated urethane resins, acrylated polyether resins, acrylated polyesters, acrylated acrylic resins and acrylated amine resins. Of course, the choice of the UV reactive polymeric material will generally be a function of several formulation and performance parameters including acceptable viscosity, photoresponse, permeability/selectivity of the resulting membrane, volatility, odor, toxicity, miscibility with diluents and photocatalyst and cost effectiveness.

The UV reactive polymeric material is typically present in the mixture in an amount of about 1 to about 99% based on weight, and preferably about 10 to about 99%.

The photocatalyst may be any of those typically used in the art. For example, photoinitiators such as diethoxyacetophenone, benzoin, benzophenone, benzoin isopropyl ether, benzil, benzoin isobutyl ether, benzoin ethyl ether, benzoin methyl ether, benzanthrone, Michler's ketone (ethyl ketone), trichloracetophenone, dimethylaminoethanolamine, diethylethanolamine, chlorothioxanthone and 2,2-dimethoxy-2-phenyl acetophenone, as well as 2,hydroxy-2-methyl-1-phenyl-propan-1-one which is marketed under the tradename DAROCUR by EM Chemicals, may all be useful in the present invention. Of course, the particular choice of the photocatalyst will generally be a function of several formulation parameters including UV curing response, solubility, toxicity, odor, and cost effectiveness.

The photocatalyst is typically present in an amount of about 0.4 to about 5% based on weight and preferably about 0.4 to about 4%.

Examples of suitable reactive diluents include acrylate and methacrylate-type reactive diluents. Such diluents include 1,4-butanediol diacrylate, 1,4-butanediol dimethacrylate, t-butylaminoethyl methacrylate, 1,3-butyleneglycol diacrylate, 1,3-butylenglycol dimethacrylate, 2-cyanoethyl acrylate, cyclohexyl acrylate, cyclohexyl methacrylate, 2,3-dibromopropyl acrylate, 2,3-dibromopropyl methacrylate, dicyclopentenylacrylate, dicyclopentenyloxyethylacrylate, dicyclopentenyloxyethyl methacrylate, 2-(N,N-diethylamino)-ethyl acrylate, 2-(N,N-ethylamino)-ethyl methacrylate, diethyleneglycol diacrylate, diethyleneglycol dimethacrylate, 2-(N,N-dimethylamino)ethylacrylate, 2-(N,N-dimethylamino)-ethyl methacrylate, dipentaerythritol-monohydroxypenta acrylate, ethyleneglycol dimethacrylate, 2-(2,ethoxyethoxy)-ethylacrylate, 2-ethoxyethyl acrylate, ethoxylated bisphenol A acrylate, ethoxylated bisphenol A methacrylate, 2-ethylhexyl acrylate, glycidyl acrylate, glycidyl methacrylate, 1,6-hexanediol diacrylate, 1,6-hexanediol dimethacrylate, n-hexylacrylate, n-hexylmethacrylate, 2-hydroxyethyl acrylate, 2-hydroxyethyl methacrylate, hydroxypropyl acrylate, hydroxypropyl methacrylate, isobornyl acrylate, isobornyl methacrylate, isodecyl acrylate, isodecyl methacrylate, isooctyl acrylate, n-lauryl acrylate, n-lauryl methacrylate, 2-methoxyethyl acrylate, neopentylglycol diacrylate, neopentylglycol dimethacrylate, pentaerythrital tetraacrylate, pentaerythritol tetramethacrylate, pentaerythritol triacrylate, 2-phenoxyethyl acrylate, tetraethyleneglycol diacrylate, tetraethyleneglycol dimethacrylate, polyethylene glycol 600 dimethacrylate, stearyl methacrylate, tetrahydrofurfuryl acrylate, tetrahydrofurfuryl methacrylate, tridecylmethacrylate, triethyleneglycol diacrylate, triethyleneglycol dimethacrylate, trimethylolpropane ethoxylated triacrylate, trimethylolpropane triacrylate, trimethylolpropane trimethacrylate and tripropyleneglycol diacrylate. Other suitable reactive diluents include vinyl acetate, vinyl chloroacetate, n-vinyl caprolactam and n-vinyl-2-pyrrolidone. The particular choice of the reactive diluent, however, will generally be a function of several formulation and performance parameters including acceptable viscosity, photoresponse, contribution to the permeability/selectively of the resulting membrane, volatility, odor, toxicity, solubility, and cost effectiveness.

If reactive diluents are used, they should be present in an amount of about 1 to about 40% based on weight and and preferably about 2 to about 20%.

As discussed previously, it has been surprisingly found that by utilizing UV resin mixtures of sufficiently high viscosity, a composite membrane may be produced which exhibits substantially reduced pore filling and thereby minimizes the problems associated with pore filling. Although the inventors do not wish to be held by any one theory to explain this phenomenon, it is believed that in contrast to lower viscosity resins, the use of high viscosity resins allows for sufficient time to complete coating and curing before any significant wetting or pore filling or the porous support occurs. In addition, it has been surprisingly found that while pore filling is minimized, adequate bonding between the porous support and the resin coating is maintained using high viscosity resin mixtures. This is quite unexpected since it is generally understood in the art that pore penetration must occur to achieve adequate bonding.

Therefore, a UV resin mixture having an appropriately high viscosity must be selected. The viscosity of the resin mixture should be at least about 35,000 centipoise and preferably from about 50,000 to 500,000 centipoise. In those cases where resins are used having viscosities in the upper portion of the range, it may be necessary to reduce the viscosity of the resin mixture for use with a particular coating method. However, this depends on the particular coating method and will not adversely affect the present invention so long as the viscosity is maintained within the acceptable viscosity levels.

The UV curable resin mixture may also contain a surfactant. It has been observed that the inclusion of surfactants will have the effect of reducing the thickness of the membranes while increasing the flux. Examples of suitable surfactants include fluorosurfactants such as the FLUORAD series of surfactants marketed by 3M Corporation, polyacrylate surfactants such as the MODAFLOW-type marketed by Monsanto, lauryl sulfate surfactants such as the SIPON-type marketed by Alcolac, AEROSOL-type marketed by American Cyanamide and DOWFAX-type market by Dow Chemical, nonyl phenol surfactants such as the TRITON-type marketed by Rohm & Haas, polyoxypropylene and ethylene surfactants such as the PLURONICS-type marketed by BASF, sodium vinyl sulfonate surfactants such as the COPSI-type market by Alcolac and nonylphenoxypolyoxyethylene surfactants such as the IGEPAL-type marketed by GAF. Of these, fluorosurfactants are most preferred. If used, the surfactants may be present in an amount of from about 0.5 to about 40% and preferably from about 12.5 to about 40%, based on the coating composition.

In addition to the above described components of the resin mixture, various additives may be included. Such additives include, pigments, defoamers, adhesion promoters, stabilizers and fillers.

The use of UV resins in the present invention may be a solventless process. However, the resin mixture can also be prepared in a solvent system. The choice of solvent will depend on the particular support which is used. That is, the reactants should dissolve in the solvent while being capable of being affected by UV light in the solvent system, and the solvent should not attack the membrane support. Representative solvents include water, and organic solvents such as alcohols, esters, acetone, ethyl acetate and compatible aqueous mixtures thereof.

To prepare the UV curable resin mixture, each of the ingredients including the resin, solvents, and UV-curing agents is weighed in the appropriate proportions, and mixed by stirring in a suitable container until blended.

The membrane of the present invention may be prepared by any conventional method. That is, the porous support may be coated with the UV curable resin mixture using any suitable coating method known in the art. Some specific examples of known methods include direct gravure coating, offset gravure coating, two and three roll pressure coating, two and three roll reverse coating, dip coating, one and two roll kiss coating, trailing blade coating, nip coating, flexographic coating, inverted knife coating, polishing bar coating and wire wound doctor coating. The porous support is typically coated once with the resin mixture. However, multiple coatings may also be applied.

Following coating, the UV curable resin coated membrane is cured. Curing may be effected using any means typically used in the art for curing with UV light. For example, a medium pressure mercury arc lamp may be used. The spectral range of interest for UV curing is in the 300–430 nm region where most photoinitiators absorb. Curing treatment is typically completed in a relatively short period of time, usually between about 1 to about 60 seconds. Following curing, the membrane may be subjected to additional treatments such as additional curing by heat treatment for about 1 to 60 minutes.

Due to the potential advantages in the areas of flexibility of chemical composition, durability, ease of construction, coating thickness and flux, the membranes of the present invention may be used in a variety of different membrane separation processes. For example, the membrane may be used for the efficient operation of gas separation processes such as $N_2/O_2$ separations, reverse osmosis processes, pervaporation processes and liquid/liquid separation processes.

The present invention is further illustrated by the following Examples. These Examples, however, should not be construed as in any way, limiting the present invention. All parts and percentages in the Examples and the remainder of the specification are by weight unless otherwise specified.

EXAMPLE 1

To demonstrate the effect of the viscosity of the UV curable resin on producing a suitable composite membrane, a series of wicking versus time tests were conducted using CELRAD 3700-20T, CELRAD 3700-25R and CELRAD 3700-15S resins. These resins are marketed by Celanese Corporation and are described in Table 1. The resin mixtures were coated on CELGARD 2500 film samples. CELGARD 2500 is a polypropylene support marketed by Celanese Corporation and has an average pore diameter of 0.04 microns. Strips of the CELGARD 2500 film were taped to a glass plate and the resin mixture was applied to the top edge of the film. The mixture was then spread down the length of the film using a one-half inch diameter smooth stainless steel rod. Subsequent to coating, the time required for wetting out of the film samples was determined by observing the transition of the film from an opaque to an almost clear appearance.

The samples which included the lower viscosity CELRAD 3700-25R and CELRAD 3700-15S resins were observed to wet out the film completely in less than 3 minutes. In contrast, the higher viscosity CELRAD 3700-20T gave substantially no wetting after 3 minutes and complete wetting of the film required approximately thirty (30) minutes. The time limitation for the lower viscosity resins prevented curing of the resins prior to significant wetting, whereas the samples containing the higher viscosity resin could be applied and cured prior to wetting or pore penetration.

TABLE 1

| Resin | UV Resins Composition | Viscosity (cps) |
|---|---|---|
| Celrad 3700 | Diacrylate ester of bisphenol A epoxy resin | 1,000,000 |
| Celrad 3700-20T | 20% trimethylolpropane triacrylate dilution of Celrad 3700 | 72,000 |
| Celrad 3700-25R | 25% tripropylene glycol diacrylate dilution of | 15,000 |

TABLE 1-continued

| | UV Resins | |
|---|---|---|
| Resin | Composition | Viscosity (cps) |
| Celrad 3700-15S | Celrad 3700 15% styrene dilution of Celrad 3700 | 4,000–9,000 |
| CMD 6700 | Acrylated urethane | 500,000 |

EXAMPLE 2

To demonstrate the use of the UV cured coated membranes of the present invention, a gas separation process was performed using CELGARD 2500 films coated with CELRAD 3700-20T and CMD 6700 resins in the same manner used in Example 1 with the exception that the CMD resin required heating to 80° C. to adequately lower its viscosity for mechanical spread coating. Even at this elevated temperature, however, the viscosity was high enough to prevent significant wicking prior to cure. The coated films were then cured in air with an ACE-HANOVIA #7830, a photo immersion lamp marketed by Ace Glass Co. Inc., at a distance of 21 cm from the film samples for a period of five minutes. From an SEM photomicrograph of the cured CMD coated film it was observed that the cured resin was present only on the surface of the CELGARD film. The thicknesses of the coatings are given in Table 2.

Using the "sweep gas method" as described in Pye et al, *Journal of Polymer Science*, 20, 287 (1976), tests were then performed to determine $O_2/N_2$ permeability coefficients with an air feed of approximately 79% $N_2$ and 21% $O_2$. The results of the gas separation measurements are set forth in Table 2. As may be seen from the results, both films demonstrated selectivity for $O_2$ over $N_2$. In addition, the flux values demonstrate the gas separation potential of the membranes of the present invention.

TABLE 2

| | $O_2/N_2$ Permeability of Celgard Coated with UV Curable Resins | | |
|---|---|---|---|
| Resin | Coating Thickness (microns) | Permeation Constant ($cm^3/cm^2$ sec, cm Hg) | % $O_2$ in Permeate |
| | | $O_2$ $N_2$ | |
| Celrad 3700-20T* | 6 | $2.04 \times 10^{-7}$  $1.71 \times 10^{-7}$ | 24 |
| CMD-6700** | 17.5 | $1.39 \times 10^{-7}$  $0.66 \times 10^{-7}$ | 36 |

*Containing 4.0% Darocur photoinitiator; 0.5% Fluorad 430 surfactant
**Containing 4.0% Darocur photoinitiator; 5.0% Fluorad 430 surfactant

EXAMPLE 3

To demonstrate the effect of introducing a surfactant into the resin coating mixture, a variety of surfactant/resin mixtures were prepared. The compositions are set forth in Table 3. The samples were then coated on CELGARD 2500 supports and cured according to the methods set forth in Example 2. In each case, the viscosity of the mixture was sufficiently high enough to prevent wetting out prior to or during curing. Mixtures A, C and E had adequate viscosity to not wet out the film prior to UV curing because the films remained opaque during the entire porcedure, Samples B, D and F, which contained much higher levels of diluent, appeared to initially wet out the CELGARD supports because the films became transparent. However, upon curing the films were opaque indicating only a surface coating. This conclusion was confirmed using SEM photomicrographs.

The coating thicknesses of the sample membranes were measured and found to be indistinguishable from the base CELGARD film which has a thickness of approximately 0.001 inches.

The membranes were then tested using the gas separation method described in Example 2. Although these membranes exhibited moderate to very high flux, in most cases little selectivity was observed. This was thought to be due to micro-defects present in the films, a traditional problem with thin film composite membranes. As a result, a second coating was applied before further examination of the gas separation performance was initiated. The results are set forth in Table 3.

It can be seen from Table 3 that the selectivity and flux of the twice coated membranes was generally even more superior to those membranes of Example 2 not containing high levels of surfactant. The flux levels were believed to be higher due to the combination of thinner coatings and inherently higher permeability of the FLUORAD surfactant component.

TABLE 3

| | $O_2/N_2$ Permeability of Celgard Coated with Mixture of Celrad 3700-20T and Fluorad FC 431 Fluorosurfactant | | | | | | | |
|---|---|---|---|---|---|---|---|---|
| | Extra Ethyl Acetate Diluent | Coating Composition (wt. g) | | Darocur Photoinitiator | Ratio Surfactant Solid/ Resin Solid | Permeation Constant ($cm^3/cm^2$ sec. cm. Hg $\times 10^6$) | | % $O_2$ in Permeate |
| Mixture | | Fluorad FC431 | Celrad 3700-20T | | | $O_2$ | $N_2$ | |
| A | 0 | 33⅓ | 16⅔ | 0.65 | 1:1 | 0.13 | 0.08 | 30.3 |
| B | 25 | 16⅔ | 8⅓ | 0.35 | 1:1 | 2.2 | 0.55 | 50.8 |
| C | 0 | 40 | 10 | 0.40 | 2:1 | 0.26 | 0.11 | 38.9 |
| D | 25 | 20 | 5 | 0.20 | 2:1 | 2.4 | 0.66 | 49.5 |
| E | 0 | 25 | 25 | 1.0 | 1:2 | 0.09 | 0.06 | 30.5 |
| F | 25 | 12.5 | 12.5 | 0.5 | 1:2 | 0.51 | 0.22 | 38.4 |

Although only preferred embodiments of the invention are specifically illustrated and described above, it will be appreciated that many modifications and variations of the present invention are possible in light of the above teachings and within the purview of the appended claims without departing from the spirit and intended scope of the invention.

What is claimed is:

1. A composite membrane for use in a separation process and having reduced pore filling comprising a microporous support and a UV curable resin coated thereon, wherein the resin is a UV curable resin having a pre-curing viscosity of at least about 35,000 centipoise.

2. A composite membrane according to claim 1 wherein the microporous support is selected from the group consisting of polyolefin supports, polystyrene supports, substituted polystyrene supports, fluorinated polymer supports, polysulfone supports, polyester supports, polyacrylate supports, polycarbonate supports and vinyl polymer supports.

3. A composite membrane according to claim 1 wherein the support has an average pore size of from about 0.005 to about 0.2 microns.

4. A composite membrane according to claim 3 wherein the support has an average pore size of from about 0.02 to about 0.04 microns.

5. A composite membrane according to claim 1 wherein the UV curable resin includes a UV reactive unsaturated polymeric material and a photocatalyst.

6. A composite membrane according to claim 5 wherein the UV reactive unsaturated polymeric material is at least one of the group consisting of acrylated epoxy resins, acrylated urethane resins, acrylated polyether resins, acrylated polyesters, acrylated acrylic resins and acrylated amine resins.

7. A composite membrane according to claim 5 wherein the photocatalyst is 2,hydroxy-2-methyl-1-phenyl-propan-1-one.

8. A composite membrane according to claim 5 wherein the UV curable resin further includes a reactive diluent.

9. A composite membrane according to claim 5 wherein the UV curable resin further includes a surfactant.

10. A composite membrane according to claim 9 wherein the surfactant is a fluorosurfactant.

11. A composite membrane according to claim 1 wherein the viscosity of the resin is from about 50,000 to about 500,000 centipoise.

12. A membrane separation apparatus comprising the composite membrane of claim 1.

13. An improved membrane separation process comprising the steps of (i) feeding a fluid including a component to be separated into a membrane containing separation apparatus and (ii) transporting said component to be separated across the membrane, the improvement comprising the use of a composite membrane having reduced pore filling, said membrane comprising a microporous support and a UV cured resin coated thereon wherein the cured resin is a UV curable resin having a pre-curing viscosity of at least about 35,000 centipoise.

14. A membrane separation process according to claim 13 wherein the support has an average pore size of from about 0.005 to about 0.2 microns.

15. A membrane separation process according to claim 14, wherein the support has an average pore size of from about 0.02 to about 0.04 microns.

16. A membrane separation process according to claim 13 wherein the UV curable resin includes a UV reactive unsaturated polymeric material and a photocatalyst.

17. A membrane separation process according to claim 16 wherein the UV curable resin further includes a reactive diluent.

18. A membrane separation process according to claim 16 wherein the UV curable resin further includes a surfactant.

19. A membrane separation process according to claim 13 wherein the viscosity of the resin is from about 50,000 to about 500,000 centipoise.

20. A membrane separation process according to claim 13 wherein said fluid is a gas.

21. A membrane separation process according to claim 20 wherein said gas contains nitrogen and oxygen.

* * * * *